Figure 1:
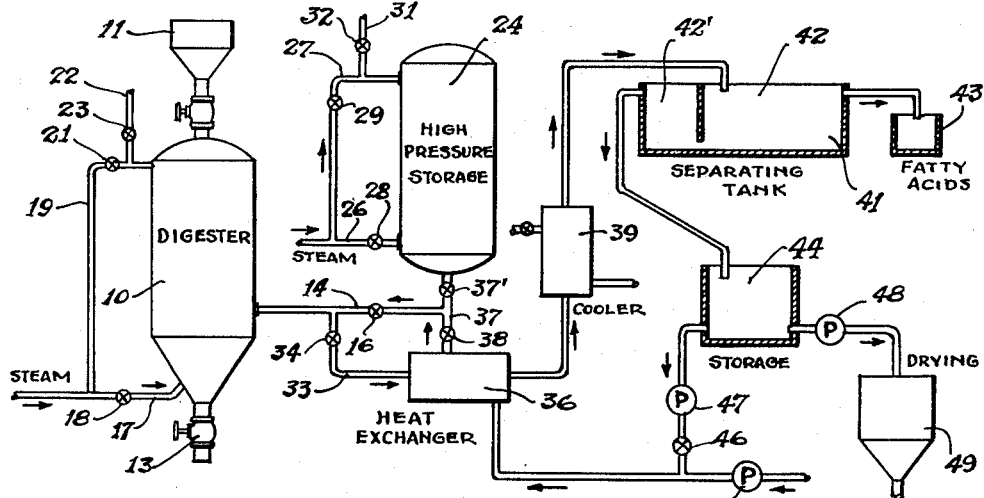

July 14, 1953     E. N. MORTENSON     2,645,651

RECOVERY OF FATTY ACIDS

Filed July 1, 1948

INVENTOR.

Everett N. Mortenson

BY

Roy J. Story

ATTORNEY

Patented July 14, 1953

2,645,651

UNITED STATES PATENT OFFICE 2,645,651

RECOVERY OF FATTY ACIDS

Everett N. Mortenson, Chicago, Ill., assignor to Swift & Company, Chicago, Ill., a corporation of Illinois Application July 1, 1948, Serial No. 36,321

10 Claims. (Cl. 260—415)

This invention relates to fat extraction, and more particularly, to a process employing water at elevated temperatures and pressures as a solvent for fatty acids.

Heretofore the employment of organic solvents, such as low-boiling-point hydrocarbons, alcohol, acetone, chlorinated hydrocarbons, etc., has been considered necessary for extracting fats, oils, or fatty acids from such materials as animal bones, spent filter aids, and other substances containing fatty materials. Most of the solvents heretofore employed have been highly inflammable; and such solvents as chlorinated hydrocarbons, which are not inflammable, have been excessively expensive. The inflammable solvents have had restricted use not only because of fire hazards, but also because of the expensive apparatus necessary. That is to say, the expense of employing organic solvents has restricted their use to processes in which large amounts of high-grade fats or oils can be recovered.

In accordance with the present invention, it has been found that water will dissolve substantial amounts of fatty acids at elevated temperatures. In order to keep the water in liquid form at such elevated temperatures, elevated pressures must also be employed. Even if the fatty acids are combined with glycerol in the form of glyceride oils or fats, the high temperatures of the liquid water split the glycerides to produce fatty acids and glycerin, both of which are soluble in water at the temperatures employed. That is to say, glycerin is soluble in substantially all proportions in water at any temperature employed in the present process; and at temperatures ranging between 200° and 320° C. or higher, fatty acids are soluble in water to an extent ranging at least about 1% to 3% or more by weight and, in the case of some fatty acids (such as those from tallow), approach mutual solubility in water at the higher temperatures.

In general, any proteinaceous material in the substance being extracted will be hydrolyzed and will also dissolve in the water. The resulting extract will therefore contain in solution fatty acids; glycerin, if the fatty material is in the form of glycerides; and hydrolyzed protein, if proteinaceous material is also present. Upon cooling to a temperature of approximately 150° C., the solubility of the fatty acids in water is very small; and at temperatures between 150° C. and room temperature, substantially all of the fatty acids come out of solution and separate from the water as an upper layer. Fatty acids are therefore easily separable from the water, and the separated water can thereafter be treated, if desired, to recover glycerin and hydrolyzed protein. The process is capable of being carried out in a variety of types of apparatus, either in a continuous manner or as a batch operation.

It is, therefore, an object of the present invention to provide an improved process of recovering fatty acids from materials containing the same.

Another object of the invention is to provide an improved process of recovering fatty acids from substances containing fatty materials in which water at elevated temperatures is employed as a solvent for fatty acids.

Another object of the invention is to provide an improved process for recovering fatty acids from substances containing fatty materials, in which water at elevated temperatures is employed as a splitting agent for glyceride oils or fats and as a solvent for fatty acids as well as any glycerin liberated in the splitting reaction.

A further object of the invention is to provide an improved process of recovering fatty acids from inorganic substances containing fatty material as well as proteinaceous material, in which liquid water under elevated temperatures and pressures is employed as a splitting agent for glycerides and as a solvent for fatty acids, glycerin, and hydrolyzed protein.

Figure 2:
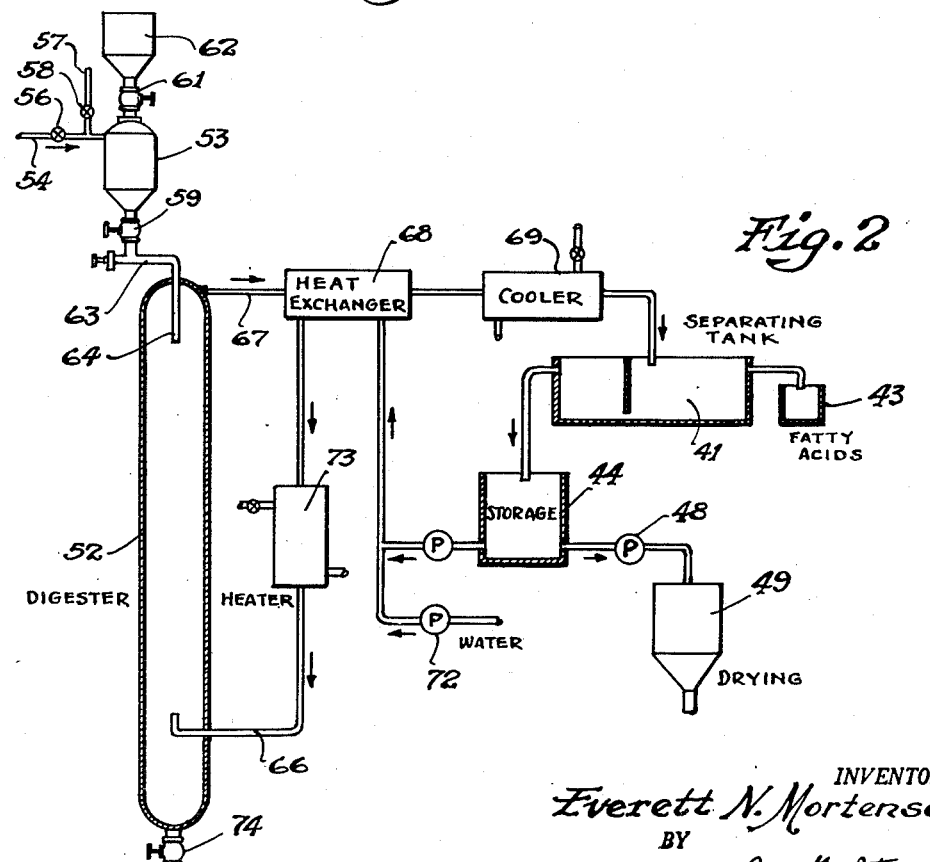

Other objects and advantages of the invention will appear in the following description of the invention given in connection with the attached drawing of which:

Fig. 1 is a diagrammatic view of one form of apparatus suitable for carrying out a batch operation in accordance with the present invention; and Fig. 2 is a view similar to Fig. 1 illustrating one form of apparatus suitable for carrying out a continuous process in accordance with the present invention.

Referring more particularly to Fig. 1 of the drawings, the apparatus illustrated therein may include a digester 10 capable of holding gases and liquids under high temperatures and pressures. Finely divided solid substances containing fatty material may be introduced into the digester 10 from a hopper 11 through a suitable valve, such as a gate valve, when the pressure in the digester 10 is atmospheric, and may be removed from the lower portion of the digester 10 through a suitable valve 13. Heated water for digesting the solid material in the digester 10 may be introduced into the digester through a pipe 14 provided with a valve 16, and high temperature steam may likewise be introduced into the lower portion of the digester 10 through a pipe 17 having a valve 18 to furnish heat to the water in the digester and also agitate the material therein. The digester 10 may also be provided with a steam connection constituting a pipe 19 provided with a valve 21 for admitting steam into the upper portion of the digester 10 for purposes explained more fully below, and may also be provided with a vent pipe 22 provided with a valve 23.

The apparatus of Fig. 1 may also include a high pressure storage tank 24 for wash water employed as described below, and may also be provided with upper and lower connections for high temperature steam constituting pipes 26 and 27 having valves 28 and 29, respectively. The tank 24 may also be provided with a vent pipe 31 having a valve 32 therein.

Highly heated water containing fatty acids in solution as well as glycerin and hydrolyzed protein, may, if any portion of the fatty material is in the form of glycerides and if proteinaceous material is present, be withdrawn from the digester 10 through a pipe 33 provided with a valve 34 and passed through a heat exchanger 36 in indirect heat exchange with fresh water supplied to the storage tank 24 through a pipe 37 provided with valves 37' and 38. The partially cooled water containing fatty acids in solution is discharged from the heat exchanger 36 through a cooler 39 and then into a compartment 42 of separating tank 41. In the heat exchanger 36 and cooler 39 the water containing fatty acids in solution is cooled sufficiently to cause substantially all of the fatty acids to come out of solution. A suspension of fatty acids in water is therefore discharged into the separating tank 41, preferably at a temperature below the boiling point of water. The fatty acids collect as an upper layer in the compartment 42' of the tank 41 and may be discharged therefrom into a receiver 43. The separated water may be discharged from the compartment 42' of the separating tank 41 into a storage tank 44.

Since the materials extracted by the present process will ordinarily contain at least some of the fatty material in the form of glycerides and also will ordinarily contain proteinaceous material, the water received into the storage tank 44 will usually still have glycerin and hydrolyzed protein in solution. The concentration of these materials in the water in the tank 44 may be increased by re-use of a portion of this water in the process. Thus a portion of the water from the tank 44 may be returned through a pipe 46 by means of a pump 47 and passed through the heat exchanger 36 and then into the high pressure storage tank 24 for use in the process, as described below. After the concentration of glycerin or hydrolyzed protein, or both, has built up in the water collected in the tank 44 to a desired extent due to re-use of the water, a portion of this water may be withdrawn from the tank 44 by means of a pump 48 and delivered to a drying apparatus 49 or other suitable apparatus for recovering the material in solution. Make-up water for the process may be introduced by means of the pump 51 so as to be mixed with water from the tank 44.

In starting up the process carried out in the apparatus of Fig. 1, a charge of properly sized solid material from the hopper 11 may be introduced into the digester 10, while the digester 10 is at atmospheric pressure. The water may be introduced into the digester 10 from the pump 51 through the heat exchanger 36 and pipes 37 and 14. In starting up the process, this water need not be heated prior to introduction into the digester 10. Sufficient water should be introduced to nearly fill the digester 10. This water may be heated by high temperature steam introduced through the pipe 17 until a temperature between approximately 200° and 320° C. is attained in the digester 10 at a pressure between approximately 211 and 665 pounds per square inch gauge. The steam not only heats the water but agitates the same to distribute the finely ground solid material throughout the digester 10, and sufficient steam may continue to be introduced through the pipe 17 to overcome heat losses from the digester 10 and maintain agitation of the water in the digester 10.

The digestion of the solid material in the digester 10 at a temperature between 200° and 320° C. will ordinarily be carried on for a period ranging from approximately 20 minutes to 1½ hours. The time required will depend upon whether the material being treated is initially in the form of fatty acids or whether this material is primarily in the form of glycerides, and will also depend upon the exact temperature selected and the nature of the glycerides. Digestion is carried out until substantially all of the glycerides, if present, have been converted to fatty acids and glycerin and the fatty acids dissolved in water. The ratio of the proportions of finely divided solid substances containing fatty material to water should be such as to insure that all of the fatty acids are dissolved in the water. That is to say, the amount of water should range from approximately 33 to 100 times by weight the amount of free and combined fatty acids in the finely divided solid material.

After substantially complete dissolution of the fatty acids in the water has been attained in the digester 10, the solids may be allowed to settle in the digester 10 and the heated solution withdrawn from the digester through the pipe 33, heat exchanger 36, and cooler 39 so as to be delivered into the storage tank 44. At the same time, fresh water may be delivered by the pump 51 through heat exchanger 36 into the high pressure storage tank 24, the fresh water absorbing heat in the heat exchanger 36 from the heated water from the digester 10. The water in the high pressure storage tank 24 may then be heated to the required temperature between 200° and 320° C. by means of high pressure steam introduced through the pipe 27. At this time the digester 10 contains the digested finely divided solid material and a substantial quantity of water admixed therewith, the water still containing fatty acid in solution.

By slightly venting the digester 10 and opening the valves 16 in the pipe 14, as well as the valve 37' in pipe 37, while closing valves 34 and 38, the heated water from the high pressure storage tank 24 may be introduced into the digester 10. Steam under high pressure and temperature conditions may also be introduced into the tank 24 through the pipe 27 and valve 29 to force the heated water from the tank 24 into the digester 10. After the valve 16 has been closed, steam may then be introduced through the pipe 17 to agitate the material in the digester 10 so as to thoroughly wash the finely divided digester material. After the washing operation, the wash water may be returned to the high pressure storage tank 24 by opening the valve 16 and slightly venting the tank 24 through the pipe 31. After the valve 16 is again closed, the digester 10 may be vented to the atmosphere through the pipe 22 so that the treated finely divided solid material may be removed from the digester through the valve 13, and a fresh charge of finely divided solid material introduced into the digester 10 through the valve 12 from the hopper 11. The previously used wash water containing a concentration of fatty acids along with glycerin and hydrolyzed protein, if present, can then be returned to the digester 10, as above described, and digestion of the fresh charge of finely divided solid material carried on by introduction of steam through the pipe 17, as heretofore described.

This operation can be repeated indefinitely— it being understood that instead of introducing completely fresh water into the process by the pump 51, a portion of the water from the storage tank 44 may be returned to the process and introduced, along with fresh water, into the high pressure storage tank 24 after being passed through the heat exchanger 36 in indirect heat exchange relation with heated water withdrawn from the digester 10. The water containing fatty acids in suspension is preferably delivered into the separating tank 41 at a temperature just below the boiling point of water at atmospheric pressure: i. e., at a temperature between approximately 80° and 95° C. If desired, however, the temperature of this water may be lowered in cooler 39 to any temperature between ambient temperatures and the boiling point of water at atmospheric pressure.

The water containing fatty acids in suspension discharged intermittently into the separating tank 41, will separate into an upper layer of fatty acids which may be discharged by gravity into the receiver 43. The separated water will also be discharged by gravity into the storage tank 44. As stated above, this water may contain glycerin and hydrolyzed proteins in solution, which materials may be recovered in any desired manner: for example, a drying operation indicated by the spray drier 49. The water discharged from the tank 41 will ordinarily be reused until it contains from 2% to 3% hydrolyzed protein, and in some cases up to 4% to 6%, before being discharged to the recovery process.

The apparatus shown in Fig. 2 may include a continuous digester 52 in the form of a vertically extending, elongated chamber capable of withstanding high temperatures and pressures. Finely divided solid material to be extracted may be continuously delivered into the upper portion of the digester 52 from a chamber 53, which may be pressure tight and in which air, steam, or even water may be introduced at high pressure through a pipe 54 provided with a valve 56. When a new charge of finely divided solid material is to be introduced into the chamber 53, this chamber may be vented to the atmosphere through a pipe 57 provided with a valve 58 after a valve 59 below the chamber 53 is closed. A valve 61 may then be opened to introduce solid material into the chamber 53 from a hopper 62. The chamber 53 may be of sufficient size to contain enough solid material for several hours or days of operation of the apparatus; and after the valve 61 has again been closed, the pressure in the chamber 53 is raised to that employed in the digester 52 and the valve 59 is opened. Any suitable feed regulating device, such as a screw conveyor indicated at 63, may then be employed to deliver regulated feed into a downwardly extending conduit 64 having a discharge opening into the digester 52 a substantial distance below the upper end of the digester 52.

An upward current of heated water is maintained in the digester 52 by introducing heated water into the digester through pipe 66 at a point substantially above the bottom of the digester 52. The heated water from the pipe 66 moves upwardly in the digester countercurrent to the movement of the settling finely divided solid material being extracted; and the rate of flow of water upwardly through the digester 52 may be correlated with the settling rate of the solid material so that the solid material is retained in suspension in the upwardly moving current of water for any desired period of time. During this digesting treatment any fatty acids contained in the finely divided solid material are dissolved in the water at the temperature employed in the process; and also any glycerides present are split into fatty acids and glycerin, and the glycerin and the fatty acids are dissolved in the water. As also explained with reference to Fig. 1, any proteinaceous material will also be hydrolyzed and dissolved.

The resulting solution is continuously withdrawn from the digester 52 through a pipe 67, passed through a heat exchanger 68 in indirect heat exchange with water entering the digester 52, and is then passed through a cooler 69 and delivered into a settling tank 41 which may be the same as the settling tank 41 shown in Fig. 1. Fatty acids in suspension in the cooled water are discharged from the separating tank 41 into a receiver 43, and the separated water may be discharged into a storage tank 44. A portion of the water from the storage tank 44 may be returned to the digester 52, by means of a pump, in admixture with fresh water introduced into the process, by means of a pump 72. A mixture of fresh water and re-cycled water may then be passed through the heat exchanger 68 in indirect heat exchange with heated water from the digester 52 and then through a heater 73, after which it is introduced into the digester 52 through the pipe 66.

Solid digested material may settle in the digester 52 below the pipe 66 and may be withdrawn therefrom from time to time through a valve 74. It will be apparent that a pressure chamber, similar to pressure chamber 53, may be employed below the digester 52 as a pressure lock to remove the settled material without opening the digester 52 to the atmosphere at any time. As explained with reference to Fig. 1, water may be discharged from the tank 44, by means of a pump 48, into any suitable apparatus for recovering glycerin and hydrolyzed protein, this apparatus being indicated as a spray drier 49.

In common with the process described in connection with Fig. 1, the temperature of the water in the digester 52 may range between 200° and 320° C. and at a pressure ranging from approximately 211 to 1600 pounds or over per square inch gauge. The time during which the material to be digested is retained in suspension in the digester 52 may range between 20 minutes and 1½ hours. Under these conditions any glycerides present are split into fatty acids and glycerin, and the fatty acids and glycerin are dissolved in the water. The amount of water employed should range from approximately 33 to 100 times the amount of free and combined fatty acids in the material being extracted, so that a solution is withdrawn from the digester through the pipe 67 containing between approximately 1% and 3% fatty acids in solution. This solution is cooled in heat exchanger 68 and cooler 69 to a temperature between approximately 20° and 95° C. and delivered into the settling tank 41. The amount of water which is separated from the fatty acids in the tank 41 which is returned to the process from the tank 44 will ordinarily be such as to provide a concentration of hydrolyzed protein in the water discharged from the process ranging between approximately 2% and 6%. The amount of glycerin contained in such water will depend largely upon the ratio of glycerides to fatty acids in the solid material being digested, and will usually not exceed 1% to 2%. It will be apparent that the settling tank 41 is merely representative of any suitable apparatus, such as continuous centrifugal separators, which is capable of separating immiscible solids or liquids from another liquid by difference in specific gravity.

While the invention has particular utility in the recovery of fatty acids from materials which are made up primarily of inorganic compounds—for example, from ground animal bones and from spent filter aids (such as fuller's earth, diatomaceous earth, activated clay, etc., which have been employed to filter or deodorize glyceride oils or fats)—it can be employed to recover fatty acids from substantially any materials containing the same, either in free or in combined form. In the case of materials which are primarily inorganic, such as those listed above, the high temperatures will ordinarily not cause modification of the inorganic residue; but it is entirely possible to treat materials in which the inorganic residue is soluble in the water, since such residue will usually remain in solution during separation of the fatty acids from the water. Any organic residue will usually be modified by the high temperatures in the presence of water to a form which either remains insoluble or remains soluble in the water during separation of the fatty acids from the water. For example, if thermal modification of the organic material is desirable or at least not deleterious, the process can be employed to recover residual fatty material in the form of fatty acids from such materials as oil seed meals after pressing operations to remove the major portion of the oil.

While I have disclosed the preferred embodiments of my invention, it is understood that the details thereof may be varied within the scope of the following claims.

I claim:

1. The method of recovering fatty acids from substances containing fatty material, which comprises: treating said substances with liquid water at temperatures and pressures whereby fatty acids contained in the substances are substantially dissolved in the water, the amount of water being such that the concentration of fatty acids in the resulting solution is between about 1 per cent and 3 per cent by weight, separating the fatty acid solution, cooling said solution to cause the fatty acids to precipitate, and separating the precipitated fatty acids from the water.

2. The method of recovering fatty acids from substances containing fats, which comprises: treating said substances with liquid water at temperatures and pressures sufficiently high to cause the fats to split into fatty acids and glycerine and to cause the bulk of the fatty acids to dissolve in the water, the amount of said water being at least about 33 times the weight of the fatty acids, separating the resulting aqueous solution of fatty acids, cooling said solution to cause the fatty acids to precipitate, and recovering the precipitated fatty acids.

3. The method of recovering fatty acids from substances containing fatty material associated with a substantial amount of unsaponifiable material, which comprises: treating said substances with liquid water at a temperature between approximately 200° and 320° C. whereby said water substantially dissolves the fatty acids, the amount of said water being between about 33 and 100 times the weight of the fatty acids, separating the resulting solution of fatty acids from the unsaponifiable material, cooling said solution to cause said fatty acids to precipitate, and separating the precipitated fatty acids from the water.

4. The method of recovering fatty acids from solid substances containing fatty material associated with a large amount of unsaponifiable material, which comprises: treating said materials with liquid water at a temperature between approximately 200° and 320° C. to cause said water to split glycerides of fatty acids present in said fatty material into fatty acids and glycerine and to dissolve the fatty acids and glycerine, the amount of said water being about 33 and 100 times the weight of the fatty acid, separating the resulting solution of fatty acids and glycerine from the residue of unsaponifiable material, cooling said solution to cause said fatty acids to precipitate, and separating said fatty acids from the water.

5. The method of recovering fatty acids from solid substances containing fatty material associated with a large amount of inorganic material, which comprises: treating said materials with liquid water at a temperature between approximately 200° and 320° C. for a time between approximately 20 minutes and 1½ hours to cause said water to split glycerides of fatty acids present in said fatty material into fatty acids and glycerine and to dissolve the fatty acids and glycerine in the water, said water amounting to between about 33 and 100 times the weight of the fatty acids, separating the resulting solution of fatty acids from any solid residue, cooling said solution to cause said fatty acids to precipitate out of the water, and separating said fatty acids from said water.

6. The method of recovering fatty acids from solid material containing fats associated with a large amount of unsaponifiable material, which comprises: treating said materials with water at a temperature between approximately 200° and 320° C. and under pressure whereby said water is maintained in a liquid phase at said temperature and the fats are split into fatty acids and glycerine and the fatty acids are dissolved in the water, the amount of said water being between about 33 and 100 times the weight of the fatty acids, separating the resulting solution of fatty acids from any solid residue, cooling the separated solution to a temperature not in excess of 150° C. to produce a dispersion of fatty acids in water, and separating said fatty acids from said water by difference in specific gravity.

7. The method of recovering fatty acids from materials containing fatty acids in free form or combined as glycerides, which comprises: treating said materials with water at a temperature between approximately 200° C. and 320° C. and under a pressure to maintain said water in a liquid phase at said temperature, continuing the treating of said material with said water for a time between 20 minutes and 1½ hours to split said glycerides and liberate fatty acids, the amount of said water being between about 33 and 100 times the weight of the fatty acids, whereby the fatty acids are substantially entirely dissolved in the water to form a solution containing about 1 per cent to 3 per cent free fatty acids, separating the resulting heated solution of fatty acids from any solid residue, cooling the separated solution to a temperature between about 20° C. and 150° C. to precipitate the fatty acids, and separating said fatty acids from the water by difference in specific gravity.

8. The method of continuously recovering fatty acids from finely divided inorganic solid material containing fatty acids in free form or combined as glycerides, which comprises: treating said materials in countercurrent flow with water at a temperature between approximately 200° C. and 320° C. and at a sufficient pressure to maintain said water in liquid form at said temperature whereby said glycerides are split into fatty acids and glycerine, the amount of water being between about 33 to 100 times the weight of the fatty acids whereby the fatty acids are substantially all dissolved in the water at said temperature, separating the resulting solution of fatty acids in water from any solid residue, cooling the separated solution to a temperature between 20° C. and 150° C. to produce a dispersion of fatty acids in water, and separating said fatty acids from said water by difference in specific gravity.

9. The method of recovering fatty acids from finely divided inorganic materials containing fatty acids in free form or combined as glycerides, which comprises: treating said materials with water at a temperature between approximately 200° and 320° C. under pressure to maintain said water in liquid form at said temperature, continuing the treatment of said material with the water for a time between 20 minutes and 1½ hours to split said glycerides and liberate fatty acids, the amount of the water being between about 33 and 100 times the weight of the fatty acids whereby the fatty acids are substantially all dissolved in the water at said temperature, separating the resulting hot solution of fatty acids from any solid residue, cooling the separated solution to a temperature between about 20° C. and 150° C. to produce a dispersion of fatty acids in water, and separating said fatty acids from said water by difference in specific gravity.

10. The continuous process of separating fatty acids from finely divided material containing fatty acids in free form or combined as glycerides, which comprises: continuously passing liquid water under pressure and at a temperature between about 200° C. and 320° C. upwardly through an elongated, vertically extending treating zone, continuously feeding said material into said zone at a position adjacent, but spaced from, the top thereof so that said fatty material falls through said water against the current of water therein whereby glycerides in said material are split to liberate fatty acids, utilizing water in an amount between about 33 and 100 times the weight of the fatty acids to dissolve substantially all of said fatty acids at said temperature, continuously withdrawing the resulting hot solution of fatty acids in water from the upper portion of said zone, cooling said solution to cause said fatty acids to precipitate out of solution, separating fatty acids from the cooled water by specific gravity, and withdrawing solid treated material from the lower portion of said zone.

EVERETT N. MORTENSON.

References Cited in the file of this patent
UNITED STATES PATENTS

| Number | Name | Date |
|---|---|---|
| 11,766 | Tilghman | Oct. 3, 1854 |
| 2,005,447 | Wurster | June 18, 1935 |
| 2,154,835 | Eisenlohr | Apr. 18, 1939 |
| 2,489,713 | Leaders | Nov. 29, 1949 |